United States Patent [19]

Synek

[11] 3,865,993

[45] Feb. 11, 1975

[54] TRUNK CIRCUIT WITH FORCED RELEASE FEATURE

[75] Inventor: Jan Synek, Chicago, Ill.

[73] Assignee: International Telephone and Telegraph Corporation, New York, N.Y.

[22] Filed: June 11, 1973

[21] Appl. No.: 368,913

[52] U.S. Cl. .............................................. 179/18 F

[51] Int. Cl. .............................................. H04q 3/22

[58] Field of Search ......... 179/18 HA, 18 F, 18 FA, 179/81 R, 84 R, 84 A

[56] References Cited

UNITED STATES PATENTS 3,586,785 6/1971 Feiner .............................. 179/18 F

*Primary Examiner*—Thomas A. Robinson

*Attorney, Agent, or Firm*—James B. Raden; Marvin M. Chaban

[57] ABSTRACT

In a telephone PABX, a trunk incoming or two-way to the PABX must be capable of release on opening of the line at the central office or main exchange. The disclosed trunk release circuit is employed with an end marked, electronic switching network and will cause release of the network and trunk promptly on a release from the outside exchange. When an on-hook condition at the exchange is detected in the trunk circuit, the network path DC level is raised, allowing the originate control in the line circuit to turn on. After a short time period, an allotter pulse from the system allotter via the trunk allotter into the trunk circuit causes the network path to release, the line will reoriginate and the trunk circuit returns to an idle condition.

4 Claims, 4 Drawing Figures

TRUNK CIRCUIT WITH FORCED RELEASE FEATURE

BACKGROUND OF THE INVENTION

The present invention is applicable to telephone systems of type shown in U.S. Pat. Nos. 3,204,044 issued 8/31/65 to U. E. Porter et al, U.S. Pat. No. 3,576,950 issued May 4, 1971 to N. Jovic and U.S. Pat. No. 3,621,144 issued on Nov. 16, 1971 to N. Jovic. The feature shown herein may be applied to a trunk circuit of the type shown in copending application Ser. No. 133,909 of Hestad et al filed 4/14/71 now U.S. Pat. No. 3,748,396 issued 7/24/73 used with a trunk allotter of the type shown in U.S. Pat. No. 3,655,918 issued on Apr. 11, 1972 to B. R. Marbury et al. All the above noted cases have of course, been assigned to the assignee hereof.

In the systems noted above, switching networks employing electronic crosspoints such as PNPN devices and the like are shown. The networks are comprised of plural matrix stages, with a path through said stages being completed in response to markings applied to both ends of the network.

At one end of the network are appearances for line circuits and other call initiating circuits, while appearances at the other end of the network include the supervisory circuits such as trunks, junctors and the like. Trunks may be one-way special trunks such as incoming or outgoing trunks, or two-way trunks of general application or one-way incoming or two-way Direct-In-Dial trunks such as those shown in the Hestad et al application noted. The present invention is usable with any of the trunks noted. In either event, the trunk circuit must be cleared responsive to release from either end or from both ends, and the network path released to prevent unnecessary network blocking.

The present circuit is provided to clear or release a trunk circuit responsive to a release or an on-hook condition at the central office. In that event, the network hold circuit is placed under the control of the release circuit and first the line circuit condition is prepared for reorigination and then the network path is released, the sequence ensuring safe line reorigination.

It is therefore an object of the invention to provide a circuit which releases the local connections in an end-marked electronic exchange responsive to the release of a call from a distant exchange.

It is a further object to provide a forced release circuit for a trunk used in combination with an end marked switching network, which drops both ends of the connection through the network on a release from the remote station and prevents the unreleased line circuit from again seizing a trunk.

These and other objects, features and advantages of the invention will become apparent from the following specification viewed in conjunction with the drawings described briefly hereafter.

DETAILED DESCRIPTION OF THE DRAWINGS

Figure 1:
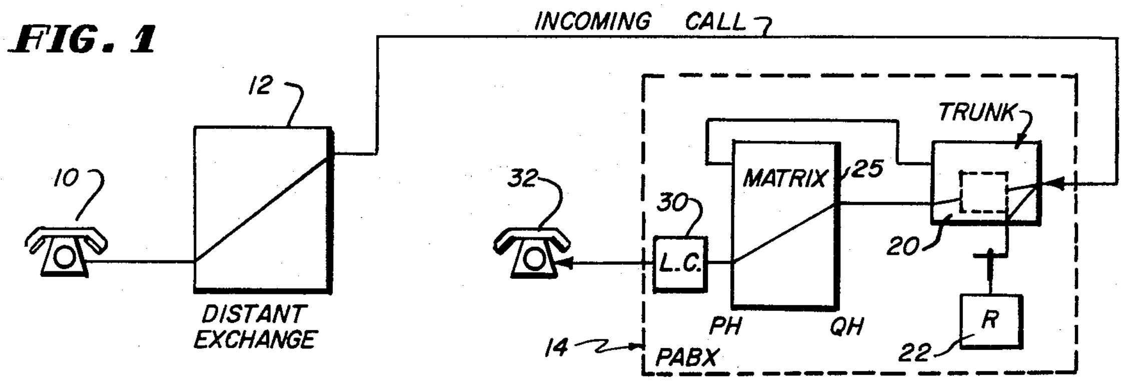
FIG. 1 is a schematic block diagram of a call connection path through a PABX to which my invention may be applied.

In FIG. 1, I show in block form the call completion path from a telephone station 10 at a distant exchange 12 to the electronic end-marked or self-seeking exchange 14 which uses my invention. The incoming call path terminates at a trunk circuit 20 which has direct inward dialling features and which may be the type shown in the copending Hestad et al application noted previously. The trunk circuit 20 accesses a register 22 for receiving digits from the distant exchange. The trunk circuit 20 has a line side appearance (PH) on the switching network matrix 25 and a supervisory side appearance (QH). The line side (PH) appearance may be used to process the call through a tie trunk or another trunk (not shown) to a satellite PABX or another distant exchange. The call is completed via a path through the switching matrix as indicated by the arrows in FIG. 1, and is held by the PH and QH marking hold path with the trunk circuit providing the QH marking end of the hold path. The register is released upon completion of the connection.

Thus a path may be traced in FIG. 1 from the station 10 at the distant exchange 12, through trunk circuit 20 and matrix 25 to a line circuit 30 representing a selected called station 32 at the PABX.

Figure 2:
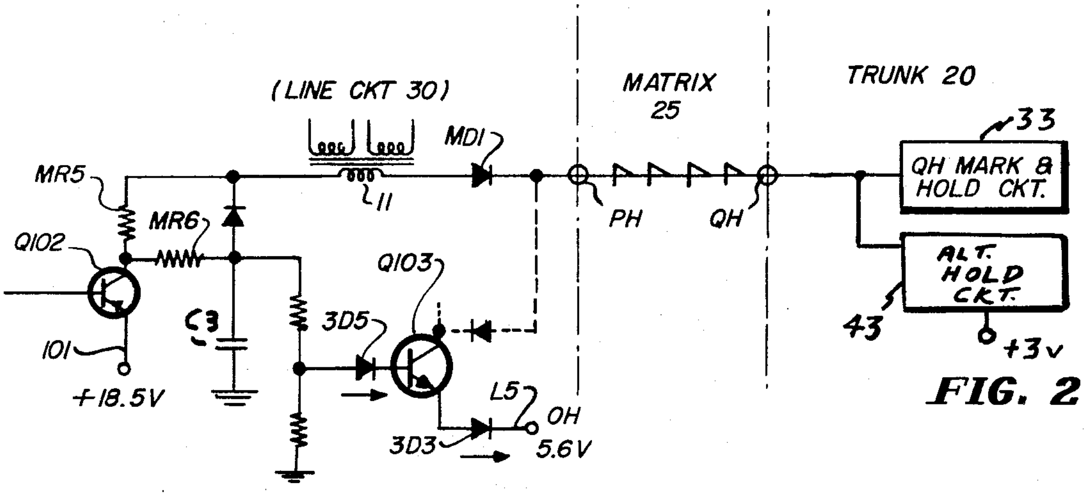
FIG. 2 is a schematic circuit diagram of a connection through an electronic matrix within the PABX of FIG. 1.

In FIG. 2 I show in greater detail the path from the line circuit 30 over its connection through matrix 25 to the trunk circuit 20. A hold path for the call connection through the matrix may be traced from the +18.5V source 101 in the line circuit through transistor Q102, resistor MR5, transformer 11, diode MD1, the four stages of the matrix from PH to QH to the QH mark and hold circuit in the trunk circuit 20. This path is maintained during conversation between the stations by means of the QH mark and hold circuit 33 in the trunk 20.

Figure 4:
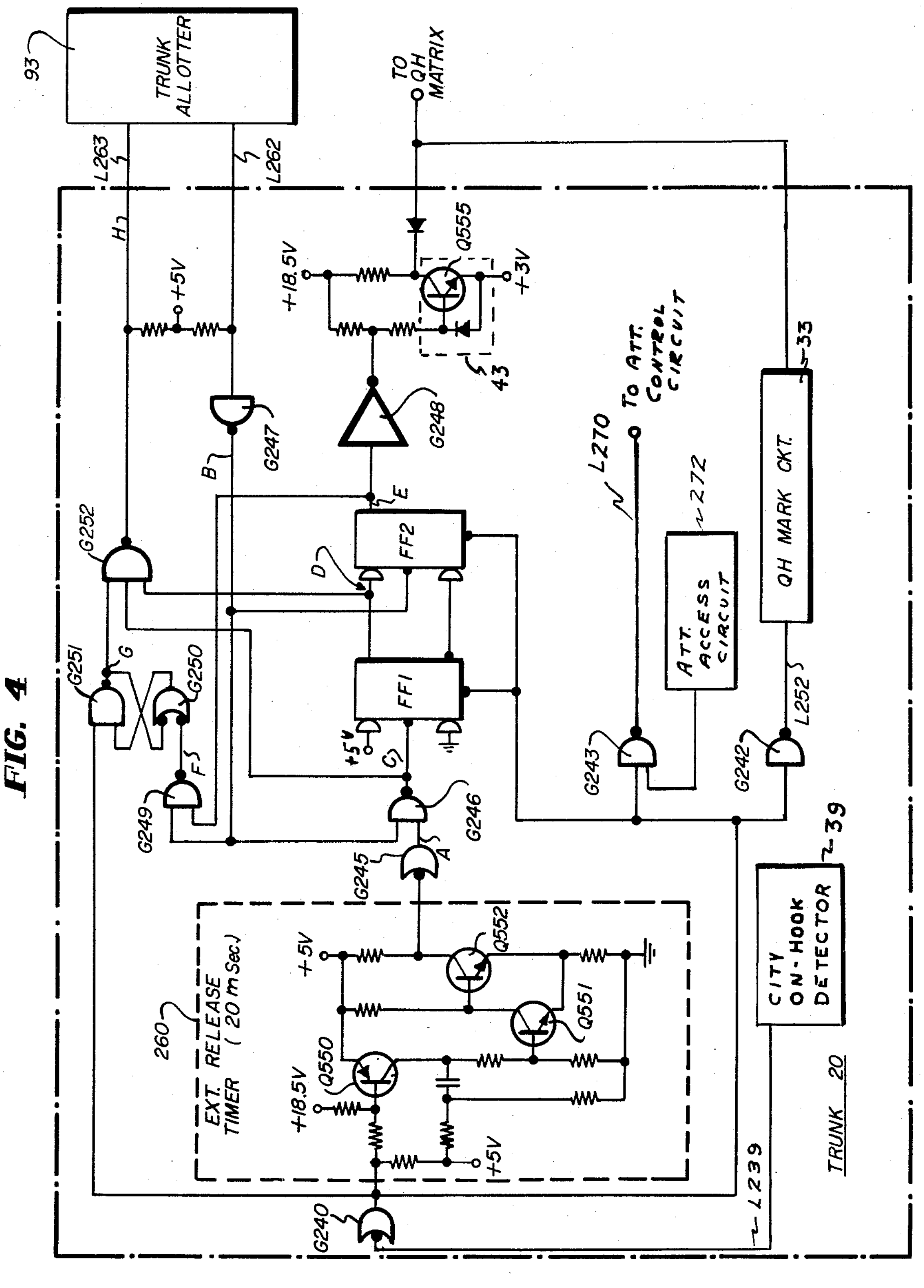
FIG. 4 is a schematic circuit diagram of my invention.

Within FIG. 4, the incoming lead L239 is connected within the trunk to sense the condition of the line to the distant exchange. With the station at a distant exchange in an off-hood condition, timer 260 and flip flops FF1 and FF2 remain reset and the alternate hold transistor 555 (in circuit 43) is enabled through high-level convertor G248. The circuit of FIG. 4 mainly comes into operation when the trunk 20 is used as either an incoming or two-way city or DID trunk, and the outside exchange or city party goes on-hook to end the conversation. The trunk must promptly sense the on-hook condition at the city exchange 12, and return to an idle condition.

As an example of the operation of my invention, I will describe a condition where the call was originated at the city exchange 12. At the conclusion of the call, when the station 10 at the city exchange goes on-hook, first, the resulting open loop condition is detected by city on-hood detector 39 within trunk circuit 20.

The signal is sent of the QH mark circuit 33 via gates G240, G242 and lead L252. This signal causes the QH hold circuit to release. This circuit as mentioned previously with respect to FIG. 2 provides supervisory side hold for the path through the electronic switching network. However, at this time transistor Q555 (FIG. 4) in alternate hold circuit 43 remains conductive and provides a +3 volt path from the source at its emitter lead to the collector lead and the QH end of the matrix path in use for the call. Thus, a substitute holding current source is provided during the release sequence causing the QH level rise from +1V to approximately +4V.

The signal from gate G240 is also fed to the extension release timer 260 to start the timer into its 20 millisecond time-out cycle responsive to the signal being received by the base of transistor Q550 within the timer. Further, the signal from gate G240 removes the reset condition from the latch arrangement comprised of gates G250 and 251 and from flip-flops FF1 and FF2.

Figure 3:
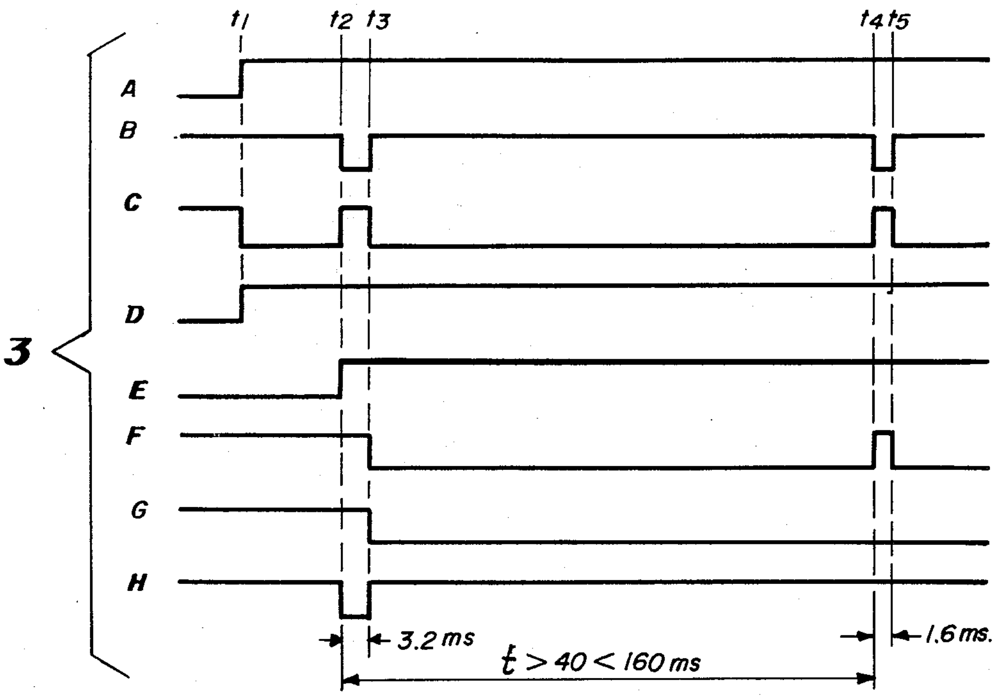
FIG. 3 is a waveform chart as applied to the circuit of FIG. 4.

After 20 milliseconds, timer 260 times out and enables Gate G246 to set FF1 (Time t1 at A in FIG. 3) through gate G245. The gates G246 and G252 along with flip-flop FF2, are now enabled to receive the first full release pulse from the trunk allotter (*T*2 at B FIG. 3). Flip flops FF1 and FF2 and Gate G246 form an allotter pulse guard circuit to pass only the first full allotter pulse from the trunk allotter, as noted in U.S. Pat. No. 3,621,144 issued 11/16/71 of 1.6 milliseconds duration to allow an idle link or trunk to be marked and to busy that trunk or link. This first full allotted pulse (B FIG. 3) will be extended to 3.2 milliseconds by the system allotter by way of gate G252 (H. FIG. 3). The second flip flop FF2 emits an output (Time *t*2 at E, FIG. 3) at the beginning of the 3.2 ms period over a path through high-level convertor G248 to shut off transistor Q555, removing the +3 volt hold from the substitute holding path and releasing the matrix connection.

At the end of the 3.2 millisecond period (time *t*3 of FIG. 3) flip flop G250/251 changes state in response to the end of the pulse received on lead L262 and passed through gates G247 and G249, thus preventing further pulses being extended via lead L263 (H. FIG. 3).

Once the matrix connection has released, and if transistor Q103 in the line circuit of FIG. 2 has not turned on yet (the worst case) the PH level will rise to +18V, causing capacitor C3 to charge up above the level it was forced from the trunk circuit clamp via Q555. The 3.2 milliseconds time slot extension should be sufficient to cause transistor Q103 to turn on and to activate the OH (originate hold) clamp over lead L5. The line circuit will be held in the originate control and will reoriginate at a free junctor time slot.

Thus, the PABX line has released its trunk connection and will be connected to a juctor until it goes on-hook. The trunk circuit once released is available for allotting responsive to other calls.

The details of an originate control to which the system applies are shown in the previously mentioned U.S. Pat. No. 3,621,144 issued 11/16/71 to N. Jovic.

If the attendant is connected to the trunk circuit the attendant access 272 is activated.

When the city party goes on-hook first, attendant release signal is sent to the attendant control circuit via G240, G243 and lead L270, which releases the attendant from the trunk and enables the trunk circuit to return into an idle condition.

I claim:

1. In a telephone system having one exchange employing a switching network of the end-marked type, and including a trunk circuit for completing and maintaining a talking path from a local station at said one exchange through the network at said one exchange and from said trunk circuit ot a station at another exchange of said system, and in which means representing said local station provides a first holding voltage for the path through the network and the trunk circuit provides a second holding voltage for the path through said network, the invention comprising means responsive to the station at the other exchange going on-hook for releasing the second holding voltage, means for substituting a temporary holding voltage for said second holding voltage to maintain the path through the network for a timed period, and means operative at the conclusion of said timed period for releasing said other temporary holding voltage to release said path through said switching network and for releasing said trunk circuit regardless of the on-hook, off-hook condition of said local station.

2. In a system as claimed in claim 1, wherein said means representing said one station comprises a line circuit, and means in said line circuit responsive to the release of said network for releasing said first holding voltage from said path to release said path.

3. In a telephone system having a local exchange employing a switching network of the type in which a talking path is seized and held operated responsive to a voltage difference between the network ends, and including a trunk circuit for providing one voltage level at one end of said network, and a line circuit representing a station at said local exchange for providing a second voltage level at the other end of said network to cause seizure of a talking path from said station to said trunk circuit through said network, the invention comprising means in said trunk circuit responsive to a station at an exchange having access to said local exchange through said trunk circuit going on-hook for releasing the second voltage level, means for substituting a temporary holding voltage for said one holding voltage level to maintain the path through the network for a timed period and for rendering said trunk circuit idle in appearance, a trunk circuit allotter operative to pulse trunk circuits appearing to be idle for an allot period, means for prolonging said allot period and means operative at the conclusion of said prolonged allot period for releasing said temporary holding voltage to release said path through said switching network and for releasing said trunk circuit.

4. In a system as claimed in claim 3, wherein there is means in said line circuit responsive to said prolonged allot period for removing the second voltage level form the other end of said network to release any connection of the line circuit to said network.

* * * * *